United States Patent
Idesawa et al.

(10) Patent No.: US 11,568,327 B2
(45) Date of Patent: Jan. 31, 2023

(54) METHOD FOR GENERATING UNIVERSAL LEARNED MODEL

(71) Applicant: AISing Ltd., Tokyo (JP)

(72) Inventors: Junichi Idesawa, Tokyo (JP); Shimon Sugawara, Tokyo (JP)

(73) Assignee: AISing Ltd., Tokyo (JP)

( * ) Notice: Subject to any disclaimer, the term of this patent is extended or adjusted under 35 U.S.C. 154(b) by 227 days.

(21) Appl. No.: 16/957,130

(22) PCT Filed: Dec. 21, 2018

(86) PCT No.: PCT/JP2018/047297
§ 371 (c)(1),
(2) Date: Jun. 23, 2020

(87) PCT Pub. No.: WO2019/131527
PCT Pub. Date: Jul. 4, 2019

(65) Prior Publication Data
US 2020/0349473 A1    Nov. 5, 2020

(30) Foreign Application Priority Data
Dec. 26, 2017 (JP) .............................. JP2017-249455

(51) Int. Cl.
*G06F 16/90* (2019.01)
*G06N 20/20* (2019.01)
*G06F 16/901* (2019.01)

(52) U.S. Cl.
CPC ......... *G06N 20/20* (2019.01); *G06F 16/9027* (2019.01)

(58) Field of Classification Search
CPC ............................ G06N 20/20; G06F 16/9027
See application file for complete search history.

(56) References Cited

U.S. PATENT DOCUMENTS

2007/0239641 A1  10/2007  Ito et al.
2015/0339572 A1  11/2015  Achin et al.
(Continued)

FOREIGN PATENT DOCUMENTS

JP   2006-293442 A1  10/2006
JP   2016-173686 A    9/2016
(Continued)

OTHER PUBLICATIONS

International Preliminary Report on Patentability received in corresponding International Application No. PCT/JP2018/047297 dated Jul. 9, 2020.
(Continued)

*Primary Examiner* — Etienne P Leroux
*Assistant Examiner* — Cindy Nguyen
(74) *Attorney, Agent, or Firm* — Mattingly & Malur, PC

(57) ABSTRACT

Generating a universal learned model that appropriately controls a group of operating devices having the same configuration. Steps comprise subjecting a predetermined machine learning model to learning based on predetermined initial data to generate an initial learned model and an integration step of incorporating the initial learned model that controls a predetermined operating device into a plurality of operating devices, and integrating a plurality of individual learned models obtained by additional learning based on respective operation data obtained by operating the respective operating devices, thereby providing a universal learned model.

13 Claims, 18 Drawing Sheets

(56) References Cited

U.S. PATENT DOCUMENTS

2015/0371139 A1* 12/2015 Kamlani ............... H04W 4/023
                                                  706/12
2018/0260687 A1   9/2018 Kanno et al.
2019/0086988 A1*  3/2019 He ..................... G06F 1/3212

FOREIGN PATENT DOCUMENTS

| JP | 2017-520068 A | 7/2017 |
|----|---------------|--------|
| WO | 2017/126482 A1 | 7/2017 |
| WO | 2017/187516 A1 | 11/2017 |

OTHER PUBLICATIONS

Extended European Search Report received in corresponding European Application No. 18895583.5 dated Aug. 12, 2021.
Andrzejak, A. et al., "Interpretable Models from Distributed Data via Merging of Decision Trees", 2013 IEEE Symposium on Computational Intelligence and Data Mining, Apr. 16, 2013, pp. 1-9.
Lavinia, B. et al., "Using Decision Tree for Efficient Data Classification in Cyber-Physical Systems", 2011 6th IEEE International Symposium on Applied Computational Intelligence and Informatics, May 19-21, 2011, pp. 385-390.
International Search Report of PCT/JP2018/047297 dated Mar. 12, 2019.
Konecny, J. et al., "Federated Learning: Strategies for Improving Communication Efficiency", Oct. 30, 2017, pp. 1-10.

* cited by examiner

METHOD FOR GENERATING UNIVERSAL LEARNED MODEL

TECHNICAL FIELD

The present invention relates to control on an operation device using machine learning technology, particularly to control on an operation device using a machine learning device having a tree structure.

BACKGROUND ART

In recent years, the field of machine learning has attracted much attention because of the existence of a large amount of data, a dramatic improvement in computing functions of computers, and algorithm progresses. In such a situation, a new machine learning framework having a tree structure has attracted attention (Patent Literature 1).

FIG. 18 is an explanatory diagram showing a basic configuration of a learning tree related to a new machine learning framework. FIG. 18(a) shows the structure of a learning tree in the learning method, and FIG. 18(b) shows an image of a state space corresponding to the structure. As is clear from the drawing, the learning tree structure includes nodes for each hierarchically divided state space from the top node (leading node or root node) to the bottom node (end node or leaf node) arranged in a tree shape or a lattice shape. The drawing shows an example in which N is 2, d is 2, and n is 2 in an N-level d-dimensional n-division learning tree, and the numbers 1 to 4 assigned to the four end nodes in the first level of the learning tree shown in FIG. 18(a) correspond to the four state spaces shown in FIG. 18(b), respectively.

Upon execution of a learning process using this learning tree, input data are sequentially associated with the respective divided state spaces, and are accumulated in the respective state spaces. At this time, if new data is input to the state space in which no data existed before, new nodes are sequentially generated. On the other hand, a predicted output is calculated by calculating transition vectors from each data included in the state space corresponding to the nodes related to the new input data, and taking an arithmetic average of the transition vectors.

CITATION LIST

Patent Literature

Patent Document 1: Japanese Patent Laid-Open No. 2016-173686

SUMMARY OF INVENTION

Technical Problem

By the way, in recent years, there has been an attempt to apply the machine learning technology to various operating devices such as robot arms in factories. For example, a preliminarily learned model is often incorporated into a group of operating devices having the same configuration.

However, even in the case of operating devices having the same configuration, the mechanical or electrical characteristics due to individual differences, aging, and the like vary depending on each operating device; therefore, there was the risk that all the operating devices could not be properly controlled with the preliminarily learned model.

An object of the present invention, which has been made in view of the aforementioned technical background, is to provide a system, method, and the like for generating a universal learned model compatible with the characteristics of each operating device.

Other objects and effects of the present invention will be easily understood by those skilled in the art by referring to the following description in the specification.

Solution to Problem

The aforementioned technical problem can be solved by the method and system having the following configurations.

A method for generating a universal learned model according to the present disclosure, includes: an initial learning step of subjecting a predetermined machine learning model to learning based on predetermined initial data to generate an initial learned model; and an integration step of incorporating the initial learned model that controls a predetermined operating device into a plurality of operating devices, and integrating a plurality of individual learned models obtained by additional learning based on respective operation data obtained by operating the respective operating devices, thereby providing a universal learned model.

With such a configuration, after common learning is performed as initial learning, additional learning is performed in accordance with the individual operating devices of the predetermined type and the results are integrated, a universal learned model that can deal with the individual characteristics of an operating device of the predetermined type can be generated. In addition, since the initial learning is performed, a certain accuracy can be ensured, so that a universal learned model can be generated while using the operating devices of the predetermined type continuously.

The initial learned model may be generated in a predetermined initial learning server connected to a network, and the initial learned model may be incorporated into the operating devices by downloading from the initial learning server to each operating device via the network.

The initial learned model may be incorporated into the operating devices by mounting the initial learned model on an integrated circuit and incorporating the integrated circuit into each operating device.

The method for generating a universal learned model may further include a re-incorporation step of incorporating the universal learned model into each operating device.

The machine learning model may be a learning model having a tree structure in which a plurality of nodes associated with respective hierarchically divided state spaces are hierarchically arranged.

The integrated circuit may include a communication unit that communicates with a predetermined integration processing server, the individual learned models may be transmitted from the respective operating devices to the integration processing server via the respective communication units, and the integration process may be executed in the integration processing server.

The initial data may be data generated based on an operating device for a test or simulation of the operating device.

The integration step may further include: a selective integration step of selectively integrating the individual learned models, according to accompanying information for the respective individual learned models.

In addition, the present disclosure can be conceived as the following method. In particular, the method according to the present disclosure includes an initial learning step of subjecting a predetermined machine learning model to learning based on predetermined initial data to generate an initial learned model; an incorporation step of incorporating the initial learned model that controls a predetermined operating device into a plurality of operating devices; an additional learning step of individually performing additional learning based on respective operation data obtained by operating the respective operating devices and generating a plurality of individual learned models; an integration step of integrating the individual learned models, thereby providing a universal learned model; and a re-incorporation step of re-incorporating the universal learned models into the respective operating devices.

In addition, the present disclosure can be conceived as a system. In particular, the system according to the present disclosure includes an initial learning unit subjecting a predetermined machine learning model to learning based on predetermined initial data to generate an initial learned model; and an integration unit incorporating the initial learned model that controls a predetermined operating device into a plurality of operating devices, and integrating a plurality of individual learned models obtained by additional learning based on respective operation data obtained by operating the respective operating devices, thereby providing a universal learned model.

Advantageous Effects of Invention

According to the present disclosure, a universal learned model compatible with the characteristics of each operation device can be generated.

DESCRIPTION OF EMBODIMENTS

One embodiment of the present invention will now be described in detail with reference to the accompanying drawings.

1. First Embodiment

A first embodiment of the present disclosure will be described with reference to FIGS. 1 to 12.
<1.1 Device Configuration>
The device configuration of a universal learned model generating system 5 according to this embodiment will be described with reference to FIGS. 1 to 3.

Figure 1:
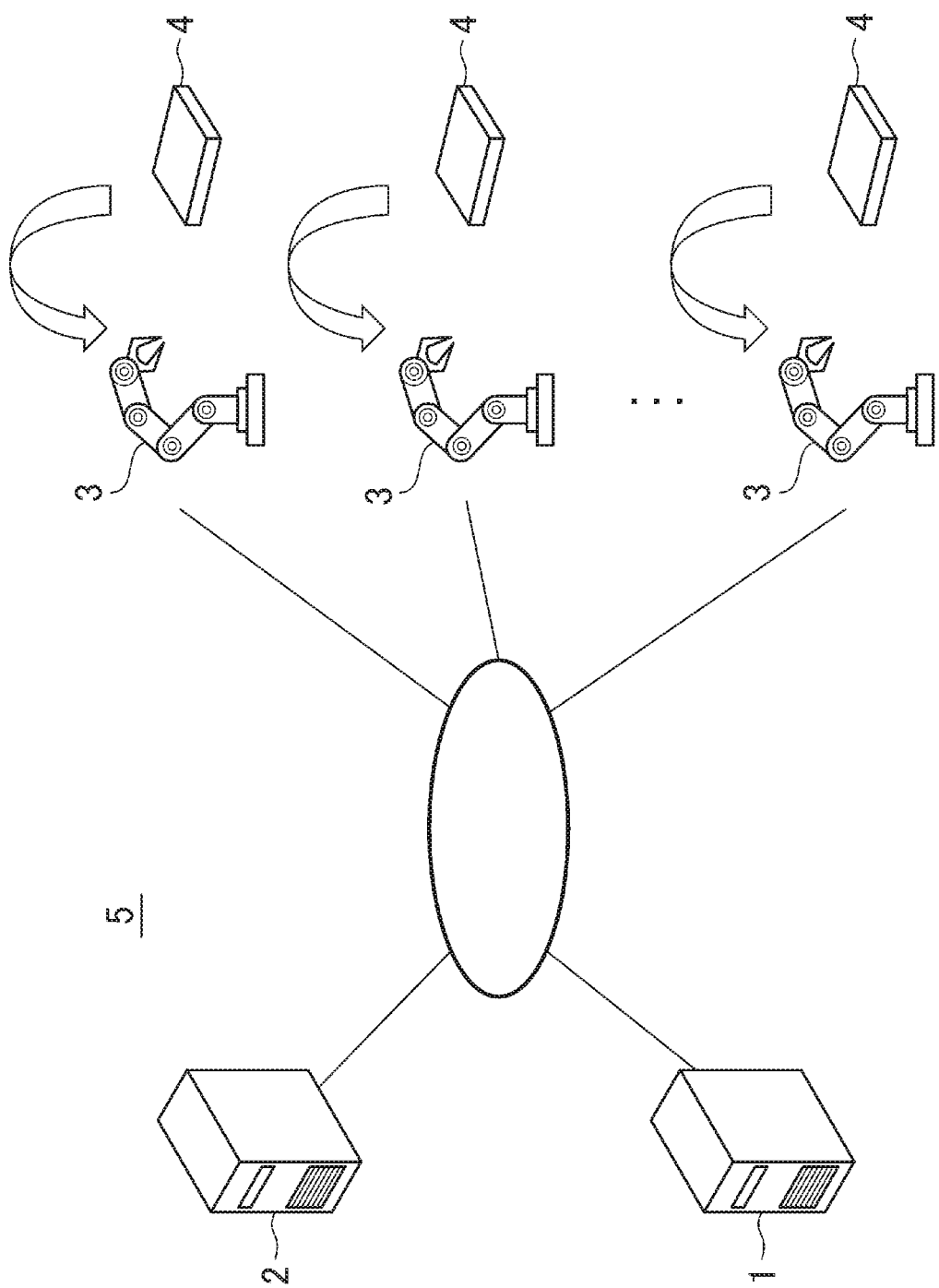
FIG. 1 is an explanatory diagram related to the overall configuration of a system.

FIG. 1 is an explanatory diagram related to the general configuration of the universal learned model generating system 5 according to this embodiment. As is clear from the drawing, the universal learned model generating system 5 includes an information processing device 1 that performs information processing such as a learning process which will be described later, an integration processing server 2 that integrates learned models, and a plurality of operating devices 3 such as robot arms. The devices 1 to 3 are connected to each other via the Internet. As will be described later, a predetermined learned model on which the learning process has been performed in the information processing device 1 is mounted on the integrated circuit 4, and the integrated circuit on which the learned model is mounted is mounted on each operating device 3.

Figure 2:
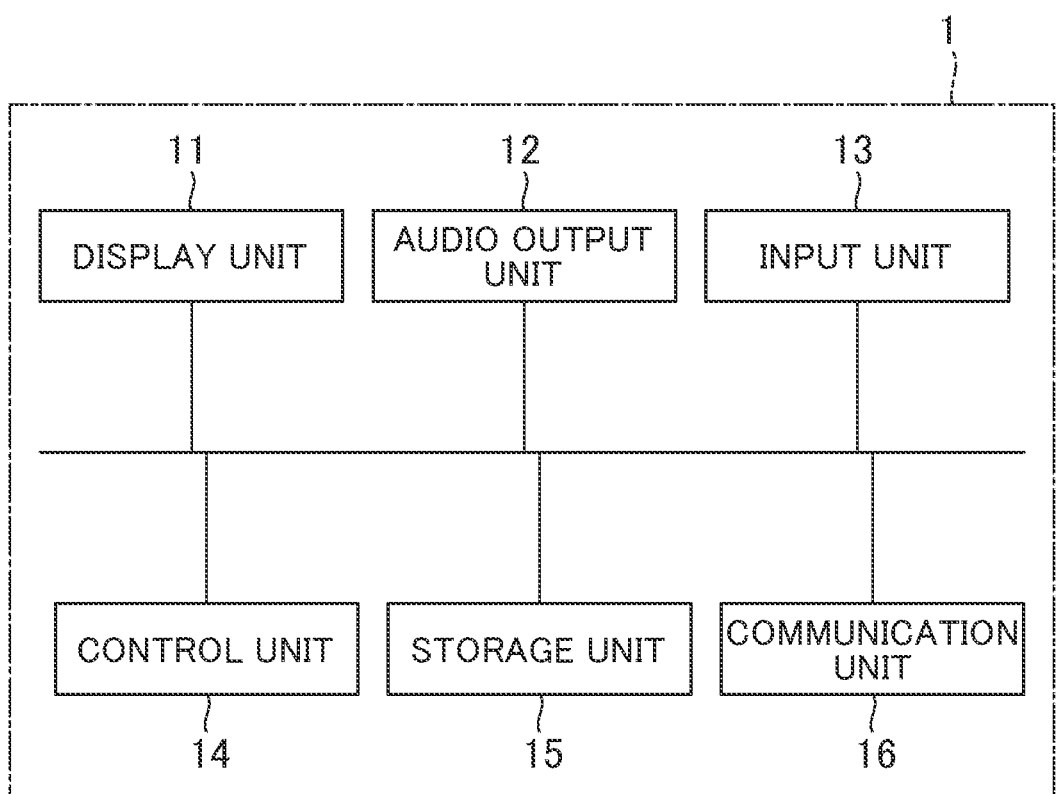
FIG. 2 is an explanatory diagram related to the configuration of an information processing device.

FIG. 2 is an explanatory diagram related to the configuration of an information processing device 1. As is clear from the drawing, the information processing device 1 includes a display unit 11 including a display or the like, a audio output unit 12 that outputs a sound via a speaker or the like, an input unit 13 that receives inputs from a keyboard, a mouse, and the like, a control unit 14 consisting of, for example, a CPU, a storage unit 15 including a memory such as a ROM, a RAM, a flash memory, or a hard disk for storing operation programs and predetermined data, and a communication unit 1 for communication with external devices. They are connected to each other via a system bus. The control unit 14 reads programs and predetermined data from the storage unit 15 and performs predetermined information processing including machine learning. Note that the hardware configuration of the integration processing server 2 is also substantially the same as that of the information processing device 1, and the description of the configuration is therefore omitted here.

Figure 3:
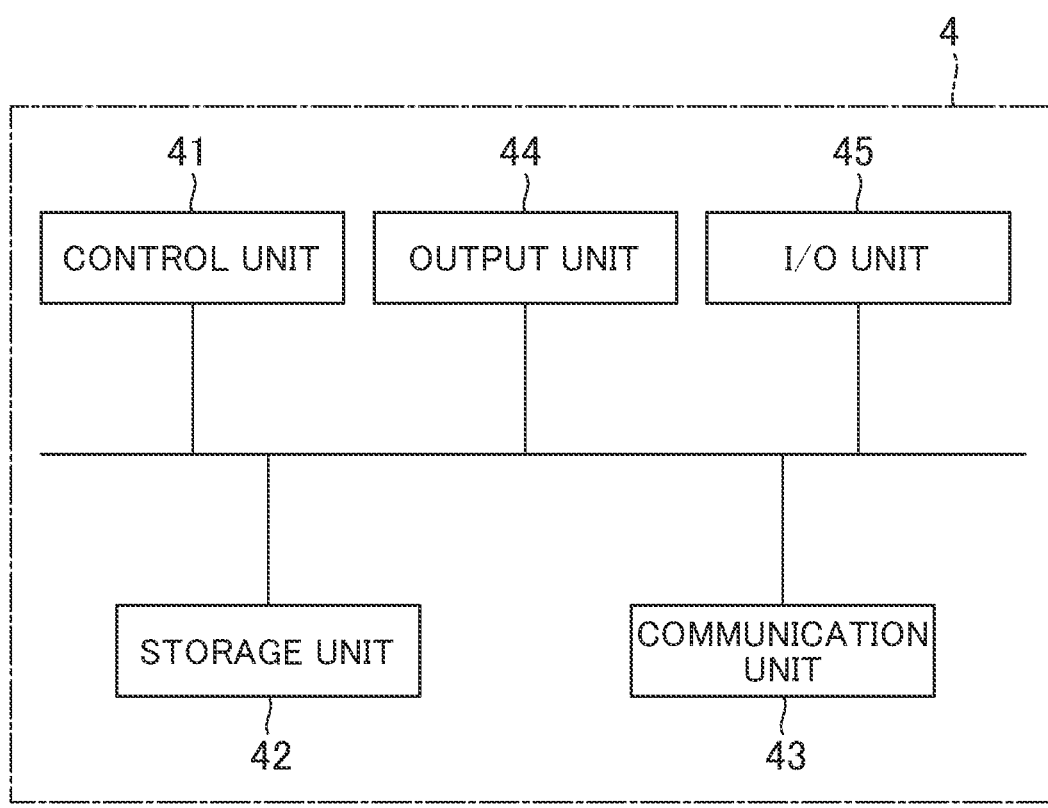
FIG. 3 is an explanatory diagram related to the configuration of an operating device.

FIG. 3 is an explanatory diagram related to the configuration of the integrated circuit 4 mounted in the operating device 3. As is clear from the drawing, the integrated circuit 4 includes a control unit 41 consisting of an MPU and the like, a storage unit 42 consisting of a ROM, RAM, or the like, a communication unit 43 consisting of a communication section for communication with external devices such as the integration processing server 2, an output unit 44 connected to the operating circuit or the like of the operating device 3 to give a control output, and an I/O unit 45 for input/output from/to external devices. These are electrically connected to each other via a system bus or the like. In other words, the control unit 41 can control the predetermined operating device 3 using a learned model read from the storage unit 42.

<1.2 Operation>

The operation of the universal learned model generating system 5 according to this embodiment will now be described with reference to FIGS. 4 to 12.

<1.2.1 Initial Learning Step>

Figure 4:
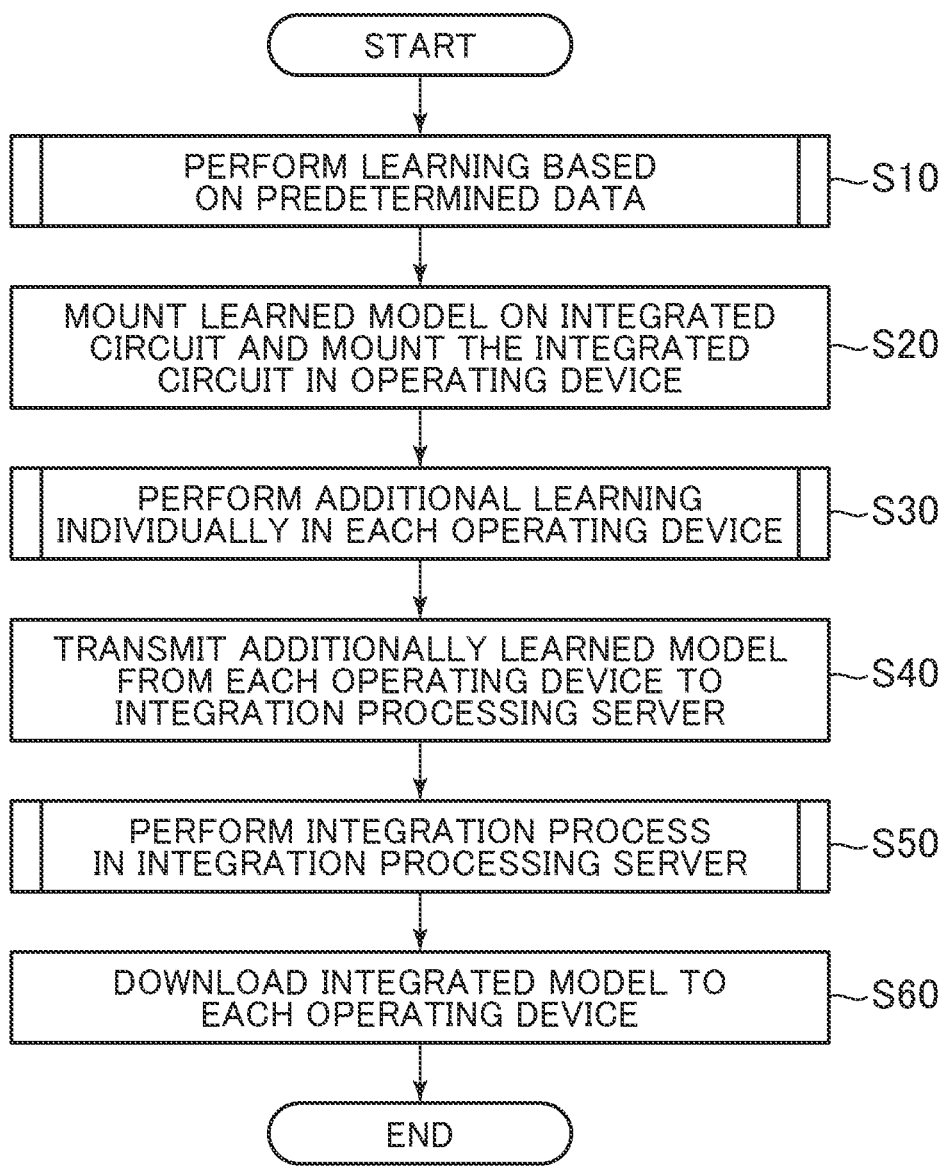
FIG. 4 is a general flowchart related to generation of a universal learned model.

FIG. 4 is a general flowchart related to a method for generating a universal learned model. As is clear from the drawing, when the process starts, the information processing device 1 performs a learning process of a model having a tree structure (S10).

Figure 5:
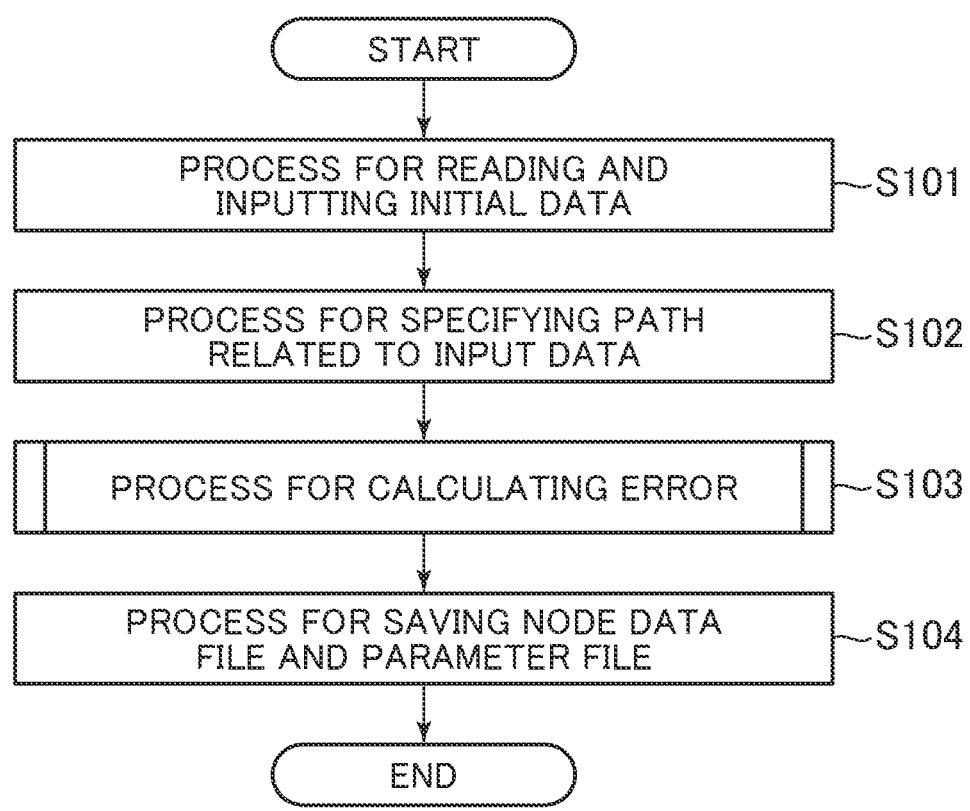
FIG. 5 is a general flowchart related to a learning process.

FIG. 5 is a detailed flowchart of the learning process (S10). As is clear from the drawing, when the process starts, initial data is first read and input to a learning model (S101). Here, the initial data consists of input data and corresponding target data, and the target data is a data group obtained by actual data groups obtained by actually operating the operating device 3 or by simulation using a physical simulator or the like. For example, if the operating device 3 is a robot arm, target data can be the command value of the output torque, the actual joint angle data obtained by an angle sensor, the hand position photographed by a camera, and the like according to the control mode. When input to the learning model is completed, the state space to which the input data should belong and the node corresponding to that state space are then specified, so that one path between multiple nodes, that is, from the root node to the end node is specified (S102). At this time, if a node that has never become active in the past exists on the path, a new node is generated in the position. Afterwards, for each node on the path, calculation process for an error corresponding to the predicted error of each node is performed (S103). Thereafter, a process (S104) of saving all data and parameters related to each node as a file is performed, and the process ends. Here, a parameter includes, for example, a value range (learning space) to be learned, that is, the maximum value and minimum value of input/output data, information about the structure of the network (the number of levels, dimensions, and divisions), and the like.

Figure 6:
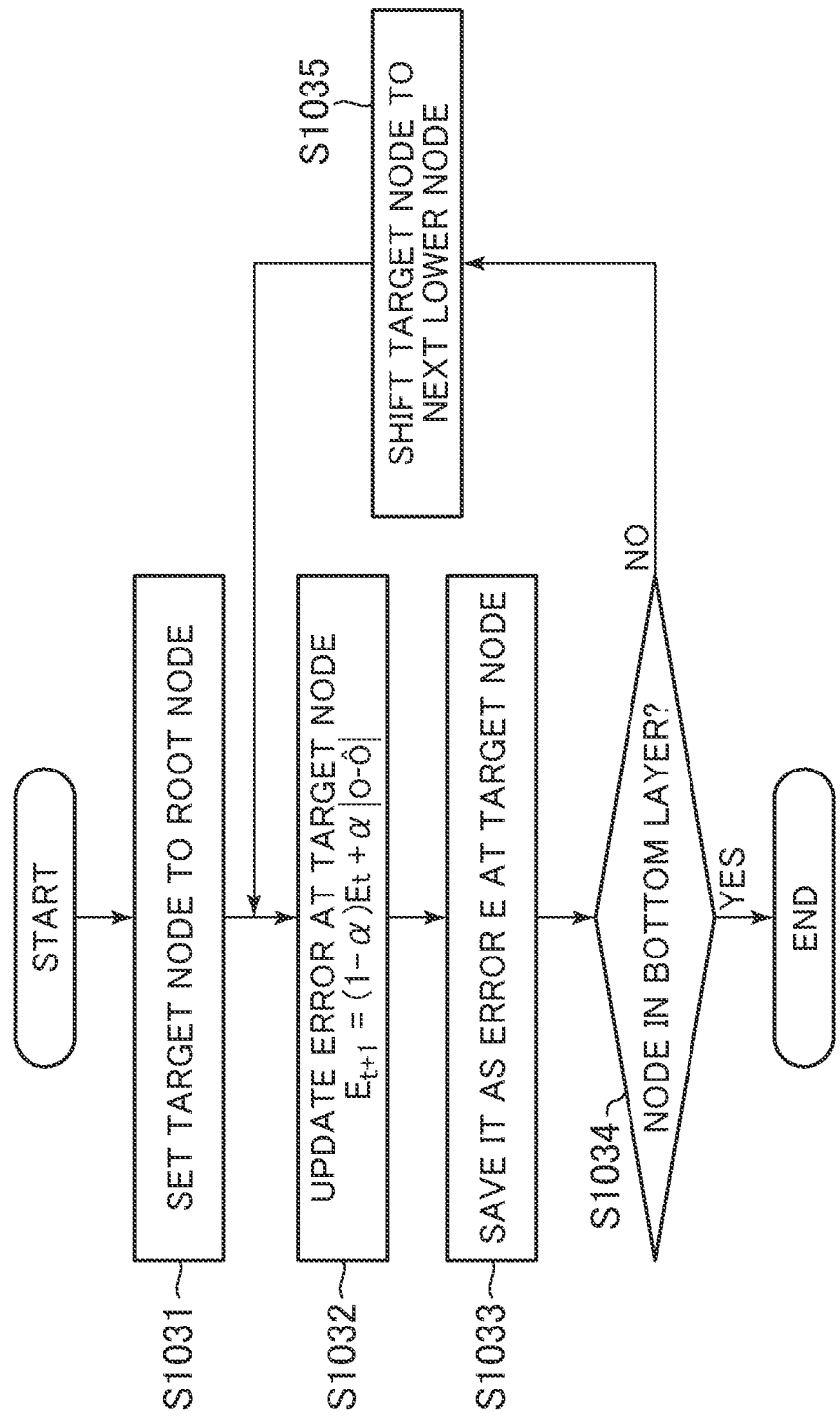
FIG. 6 is a flowchart related to an error calculation process.

FIG. 6 is a flowchart showing the details of an error calculation process (S103). When the process starts, the root node is first set as a target node (S1031). Next, for the target node, an error updating process is performed according to the equation of $E_{t+1}=(1-\alpha)E_t+\alpha|O-O'|$ (S1032). Here, $E_{t+1}$ represents the error after updating, $E_t$ represents the error before updating, $\alpha$ represents the forgetting factor ($0<\alpha<1$). As is clear from the equation, the error after updating $E_{t+1}$ is calculated by weighting and addition using a forgetting factor $\alpha$ for the error before updating E t and the absolute value of the difference between a predicted output O based on the input data and a predicted output O' based on data included in the target node. In other words, as the difference between the predicted output O based on the input data and the predicted output O' based on past data included in the target node decreases, $E_{t+1}$ decreases, which means that as the error $E_{t+1}$ decreases, higher prediction accuracy is obtained. The updated error $E_{t+1}$ is stored in the storage unit 15 as an error E in association with the target node (S1033).

Afterwards, a determination process for determining whether or not this target node is at the bottom (S1034). If the node is not at the bottom, a process for shifting the target node to the next lower level is performed (S1035). This series of processes including the process for shifting the node to the next lower level on the path of the target node (S1035), error updating process (S1032), and storage process (S1033) is repeated until the node reaches the bottom (NO in S1034). On the other hand, when the target node reaches the node at the bottom (end node) (YES in S1034), the process ends. In other words, this series of processes generates an error E corresponding to prediction accuracy for each of all nodes on the path.

The method for calculating the error E is not limited to the above-described one. Accordingly, an error obtained, for example, by referring to a node present on the path at a level lower than that of the target node may be used, for example.

<1.2.2 Mounting Steps>

Returning to FIG. 4, upon completion of the learning process, a process for mounting the learned model corresponding to the learning result on the integrated circuit (IC) 4 is performed, and a process for mounting the integrated circuit 4 on each operating device 3 is then performed (S20). To be specific, the tree structure model that has been learned based on the aforementioned initial data is read out by the control unit 41 and stored in the storage unit 42 in an executable format. Further, the learned model is configured so that additional learning can be performed, and when new data is obtained in each operating device 3, additional learning can be performed based on the data.

<1.2.3 Additional Learning Step>

After completion of the process for mounting on the operating device 3, the operating device 3 is actually controlled using the mounted learned model, and an additional learning process is performed based on actual operation data obtained by that operation (S30).

Figure 7:
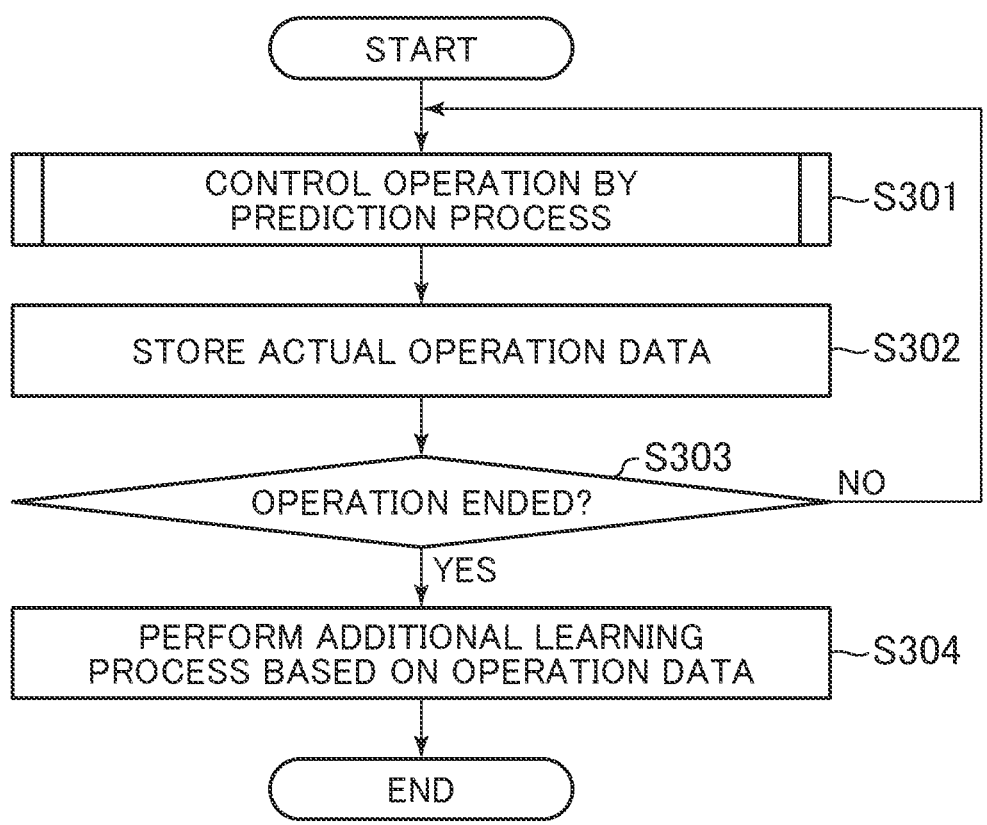
FIG. 7 is a flowchart related to the behavior of an operating device.

FIG. 7 is a detailed flowchart related to the operation of the operating device 3 (S30). As is clear from the drawing, when the process starts, the operation of the operating device 3 is controlled by a prediction process using the learned model (S301).

Figure 8:
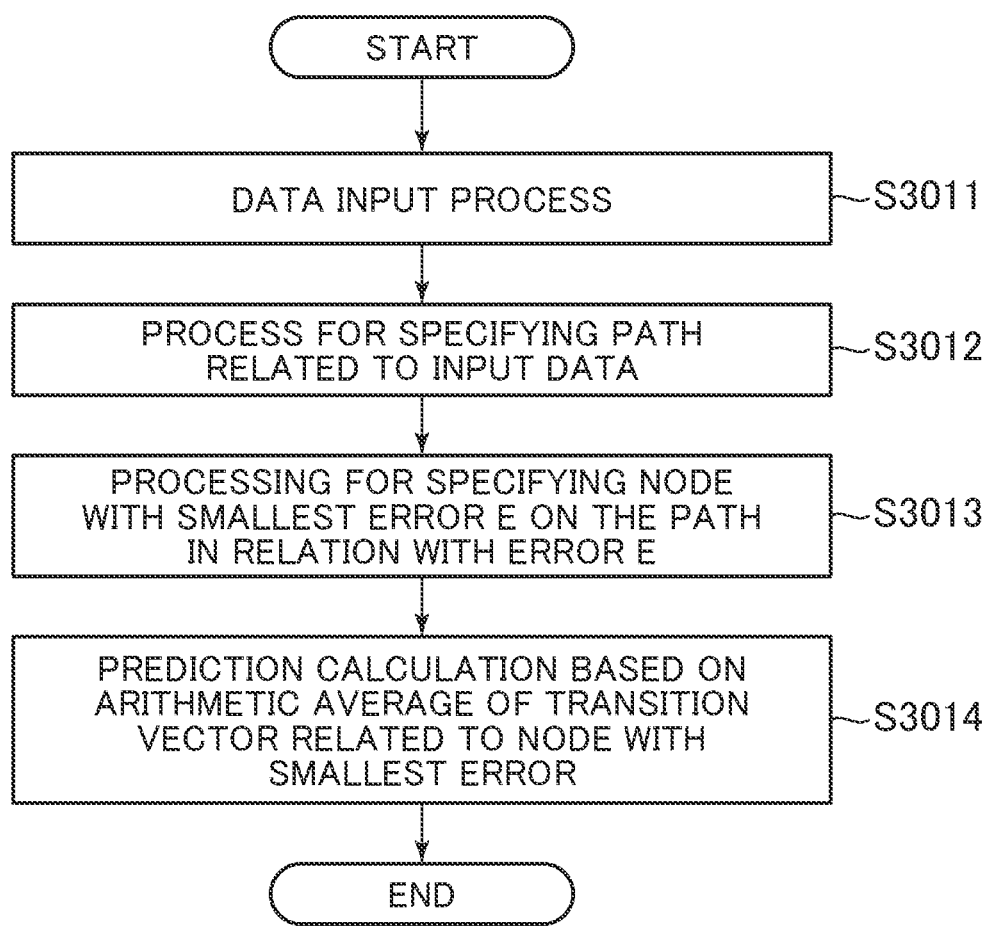
FIG. 8 is a flowchart related to a prediction process.

FIG. 8 is a flowchart related to details of the prediction process (S301). As is clear from the drawing, when the process is started, new data related to the operating device 3 is first obtained and the data is used as input data (S3011). Next, according to the input data, the state space (node) to which it should belong is specified, so that one path consisting of a series of multiple nodes is specified (S3012). When one path is specified, a node having the smallest error E on the path is specified (S3013), and a predicted output is generated based on the arithmetic mean of the transition vectors (the resultant vector of the transition vectors) of each data corresponding to the node with the minimum error E (S3014). This predicted output is transmitted as a command value to the operation circuit of the operating device 3 via the output unit 44, and the operating device 3 operates according to this. In other words, the prediction output is generated based on the node with the minimum error on the path, so that the prediction output can be generated based on the node that is expected to have relatively high prediction accuracy.

Note that the predicted output is generated based on the data corresponding to the node with the minimum error on the path in this embodiment, but the process is not limited to this. Accordingly, for example, a predicted output may be generated based always on the data corresponding to an end node.

Returning to FIG. 7, when the prediction process ends, actual device operation data on the operating device 3 is stored (S302). A series of processes including the prediction process (S301) and the operation data storing process (S302) are repeated until a predetermined operation end condition is satisfied (NO in S303). When the predetermined operation end condition is satisfied (S303), a series of operations ends, and an additional learning process using the stored operation data as training data is performed (S304). This additional learning process is substantially the same as the process shown in FIG. 2 (S101 to S104), and the description thereof will therefore be omitted. The process then ends.

To describe the operation shown in FIG. 7 specifically, a description will be given, as an example, of a task for transition of the joint angle of a robot arm with single joint having a joint angle of 0 degree with respect to a predetermined reference in the initial state, to the state with 30 degrees. First, when the process is started and the initial angle (0 degree) and the target angle (30 degrees) are given to the learned model that has learned the relationship between each of them and the command value of the output torque, a process for predicting the command value of the output torque is performed, and the operation of the robot arm is controlled according to the predicted output (S301). After the operation control, the sensor provided to the robot arm detects angle data as actual operation data (S302). Subsequently, when the task ends with the actual driving of the robot arm, the operation ends (YES in S303), and an additional learning process is performed using the actual angle value obtained from the sensor (S304). As described above, the robot arm performs additional learning for each actual operation to improve accuracy. Here, the configuration is such that the output torque is predicted using the initial angle and the target angle as inputs, but the present disclosure is not limited to such a learning configuration. It is therefore needless to say that input/output configurations using other combinations may be adopted.

<1.2.4 Integration Processing Step>

Returning to FIG. 4, when the additional learning process (S30) in each operating device 3 is completed, the data on the additional learned model, that is, the data on the nodes and parameters from each operating device 3 is transmitted to the integration processing server 2 via the network (S40). Upon reception of the data, the integration processing server 2 performs a process for integrating the additional learned models (S50).

Figure 9:
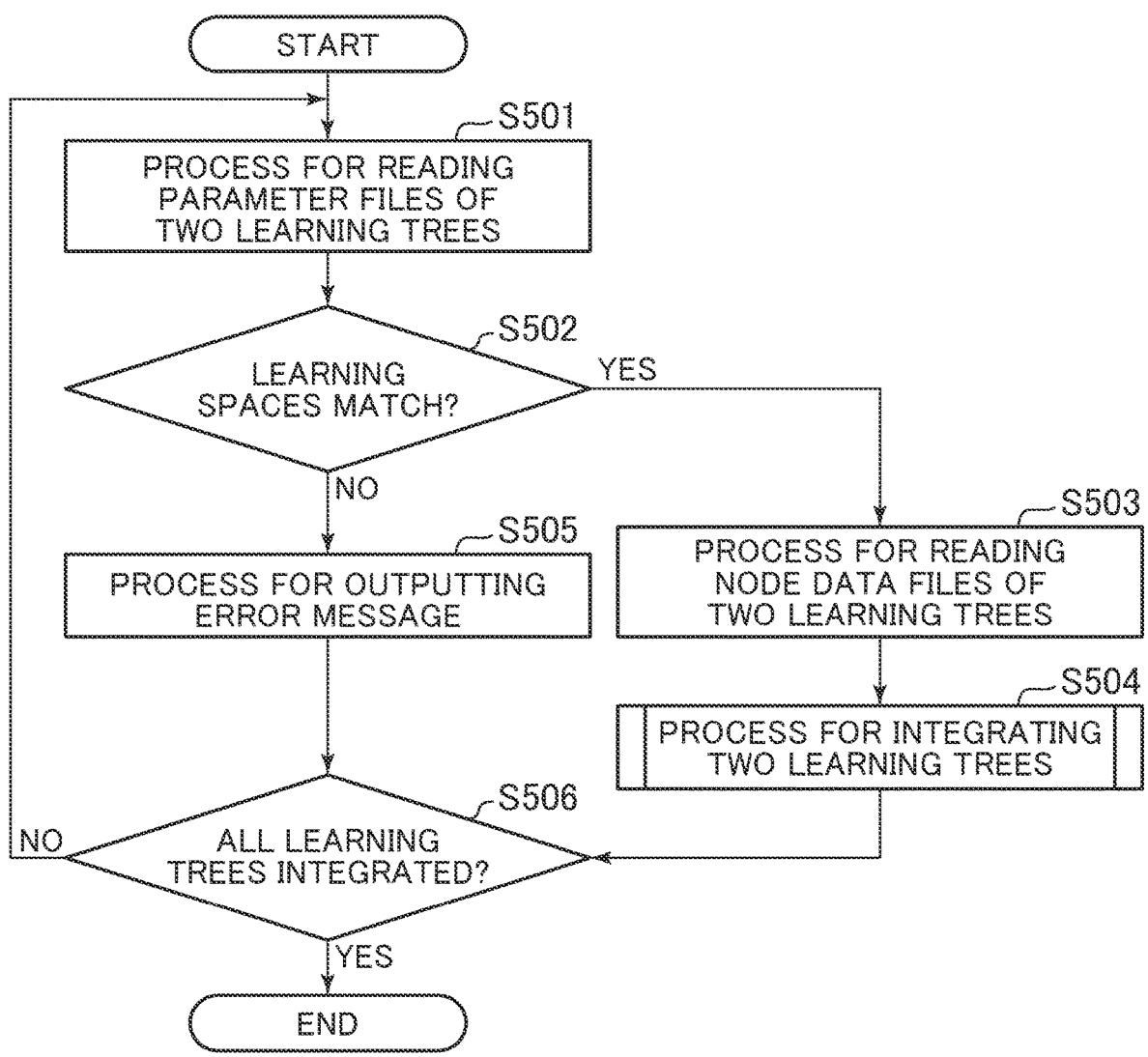
FIG. 9 is a flowchart related to an integration process.

FIG. 9 is a detailed flowchart related to the integration process (S50). When the process starts, for two different learned models, parameter files, which are generated when the learned models are generated, are read out (S501). Whether or not the learning spaces match or roughly match is determined (S502). When they do not match (NO in S502), an error message notifying the user that integration cannot be performed is output through a display (not shown in the drawing) (S505), and whether or not the process for integrating all the learning trees has been completed is then determined (S506). In contrast, when the learning spaces match or roughly match, data files related to the nodes of the two learned models are read (S503). Afterwards, a process for integrating learning trees related to two different learned models, which will be described later, is performed (S504), and whether or not the process for integrating all the learning trees has been completed is then determined (S506). If it is determined that the process for integrating all the learning trees has not been completed (NO in S506), the integration process is performed using another combination of learning trees (NO in S506). In contrast, if it is determined that the process for integrating all the learning trees has been completed (YES in S506), the process ends. Here, a rough match between learning spaces refers to, for example, a situation in which, within a range in which a margin of a predetermined rate (e.g., about 10%) is given to the maximum value and minimum value of the data included in one of the learned models, the maximum value and minimum value of the data included in the other learned model are included.

Figure 10:
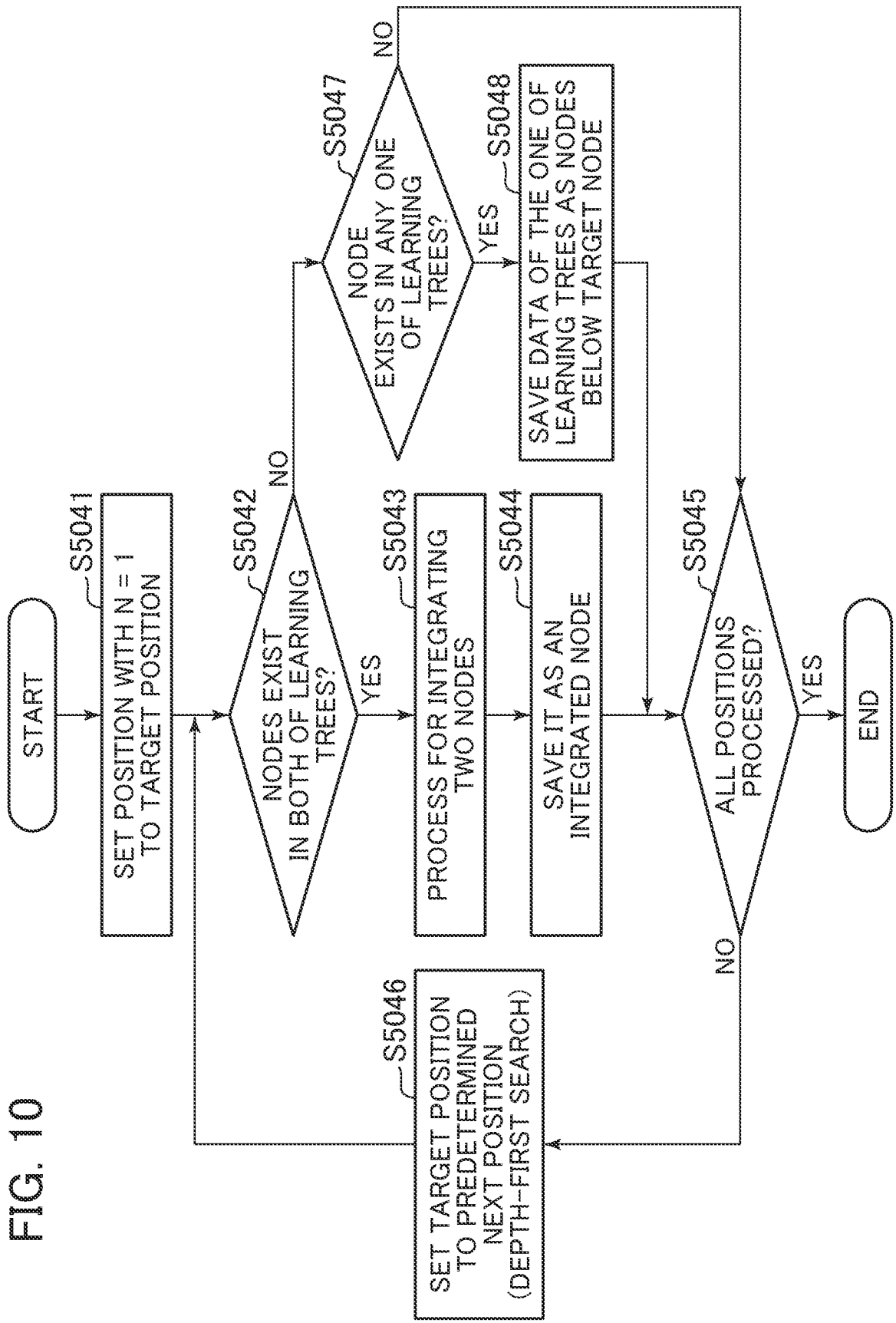
FIG. 10 is a detailed flowchart related to the integration process.

FIG. 10 is a detailed flowchart related to the integration process (S504). Upon the start of the process, the first node position is set as a target position (S5041). Next, in the target position, a determination process is performed to determine whether a node exists in any learning tree (S5042). If any node exists in both of the learning trees (YES in S5042) in the target position, a process for integrating the two nodes is performed (S5043).

Figure 12:
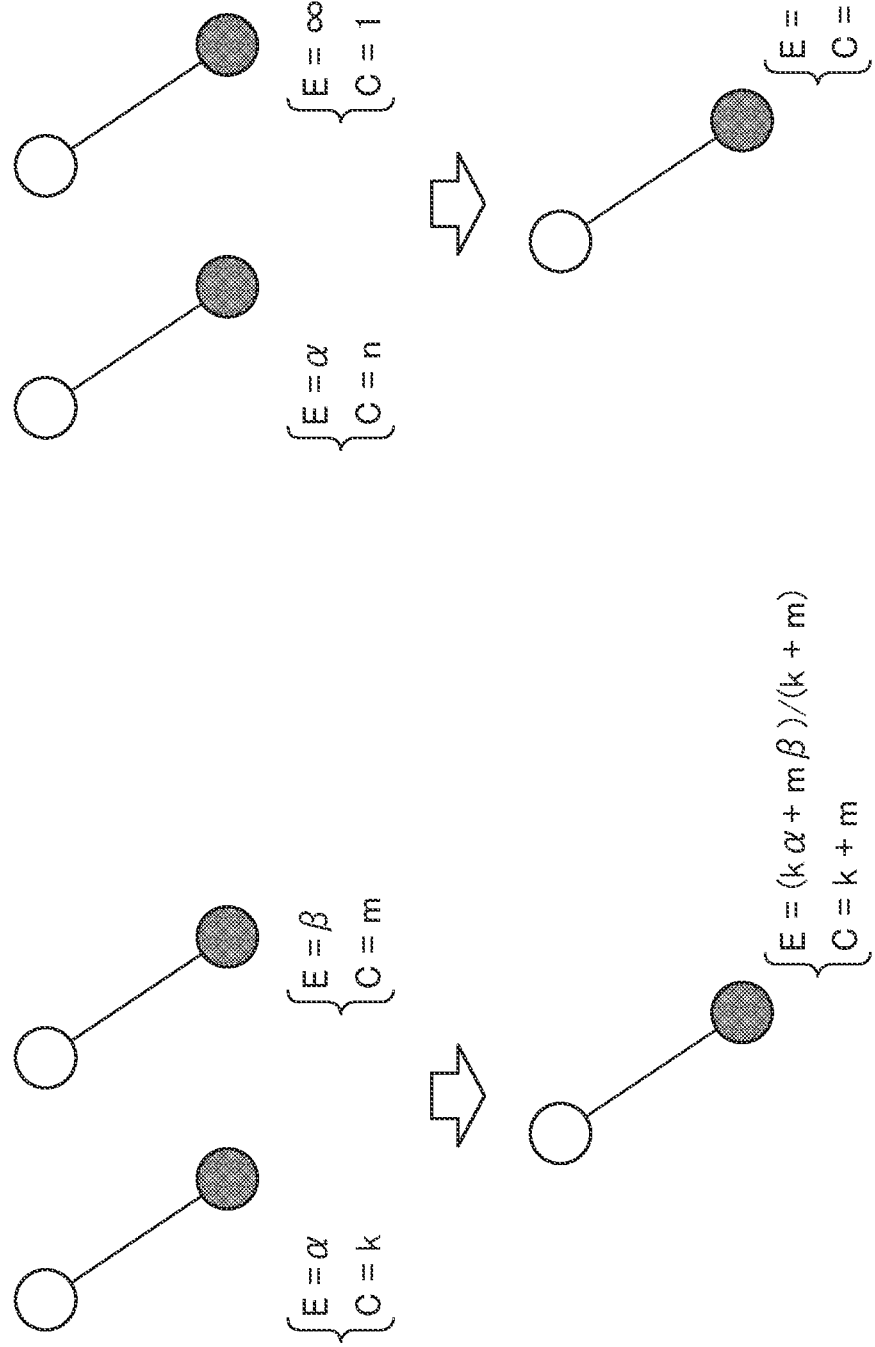
FIG. 12 is a conceptual diagram (part 2) related to the integration process.

An aspect of the node integration process according to this embodiment will now be described. FIG. 12 is a conceptual diagram related to the node integration process (S5043). FIG. 12(a) is a first example of integration in which the two upper left-right colored nodes are integrated into one lower colored node. In the drawing, E represents the above-mentioned error, and C represents the number of pieces of data that has been included so far. The error E of the upper left node is $\alpha$ ($>0$), the number of pieces of data C is k (an integer greater than or equal to 0), the error E of the upper right node is $\beta$ ($>0$), and the number of pieces of data C is m (an integer greater than or equal to 0). When these nodes are integrated, the data associated with each node is integrated so as to be associated with one node. Further, the error E after integration is calculated by weighting and adding the above-described errors $\alpha$ and $\beta$ using the numbers of pieces of data k and m. Furthermore, the number of pieces of data C after integration is calculated by adding up each number of pieces of data k and m.

With such a configuration, the nodes are integrated by weighting and addition according to the number of pieces of included data, so that learning-related parameters can be integrated according to the reliability based on the number of pieces of data.

FIG. 12(b) is a second example of integration in which the two upper left-right colored nodes are integrated into one lower colored node. For the upper left node, the error E is $\alpha$ ($>0$) and the number of pieces of data C is n (an integer greater than or equal to 0), and for the upper right node, the error E is $\infty$ and the number of pieces of data C is 1. Here, the error E is $\infty$ which is a value given for convenience because the number of pieces of data associated with the node is still one and the error is not defined. When these nodes are integrated, the data associated with each node is integrated so as to be associated with one node. Further, the error E after integration is calculated as $\alpha$ on the basis of the above-described errors $\alpha$ and $\infty$. Furthermore, the number of pieces of data C after integration is calculated as n+1 by adding up each number of pieces of data n and 1.

In this embodiment, the data associated with each node, the error E, and the number of pieces of data C are targets to be integrated during the node integration process, but the targets to be integrated are not limited to these parameters. Accordingly, it is a matter of course that during node integration, other parameters associated with the node may be targets to be integrated.

Referring back to FIG. 10, upon completion of the node integration process (S5043), the integrated node is stored in the storage unit (S5044). Afterwards, a determination process is performed for determining whether or not all node positions have been processed (S5045).

In contrast, if neither of the learning trees include a node in the target position (NO in S5042), a determination process is then performed for determining whether or not a node exists in any one of the learning trees (S5047). If neither of the learning trees include a node (NO in S5047), a determination process is then performed for determining whether or not all node positions have been processed, without performing any process thereafter (NO in S5047). If there is a node in the target position of any one of the learning trees (YES in S5047), the nodes below the target node of data of one of the learning trees including the node are duplicated and saved as integrated data (S5048). Afterwards, a determination process is performed for determining whether or not all node positions have been processed (S5045).

With such a configuration, when a certain node exists only in one of the learned models, an efficient integration process can be performed taking advantage of the fact that the nodes below that node also exist only in the one of the learned models.

When the process has been performed for all the node positions (YES in S5045), the process ends. In contrast, if the process has not yet been performed for all the node positions (NO in S5045), a process is performed for shifting the target position to a predetermined next node position (S5046), and the node integration process (S5043) or a process for duplication of one of the nodes (S5048) is performed again. At this time, the setting of the target position (depth-first search) is performed in order from the higher-level node position. This is because when nodes exist only in one of the learning trees (YES in S5047), duplication of the nodes below the target node is performed (S5048), and it is therefore more efficient to search from higher-level node positions.

Figure 11:
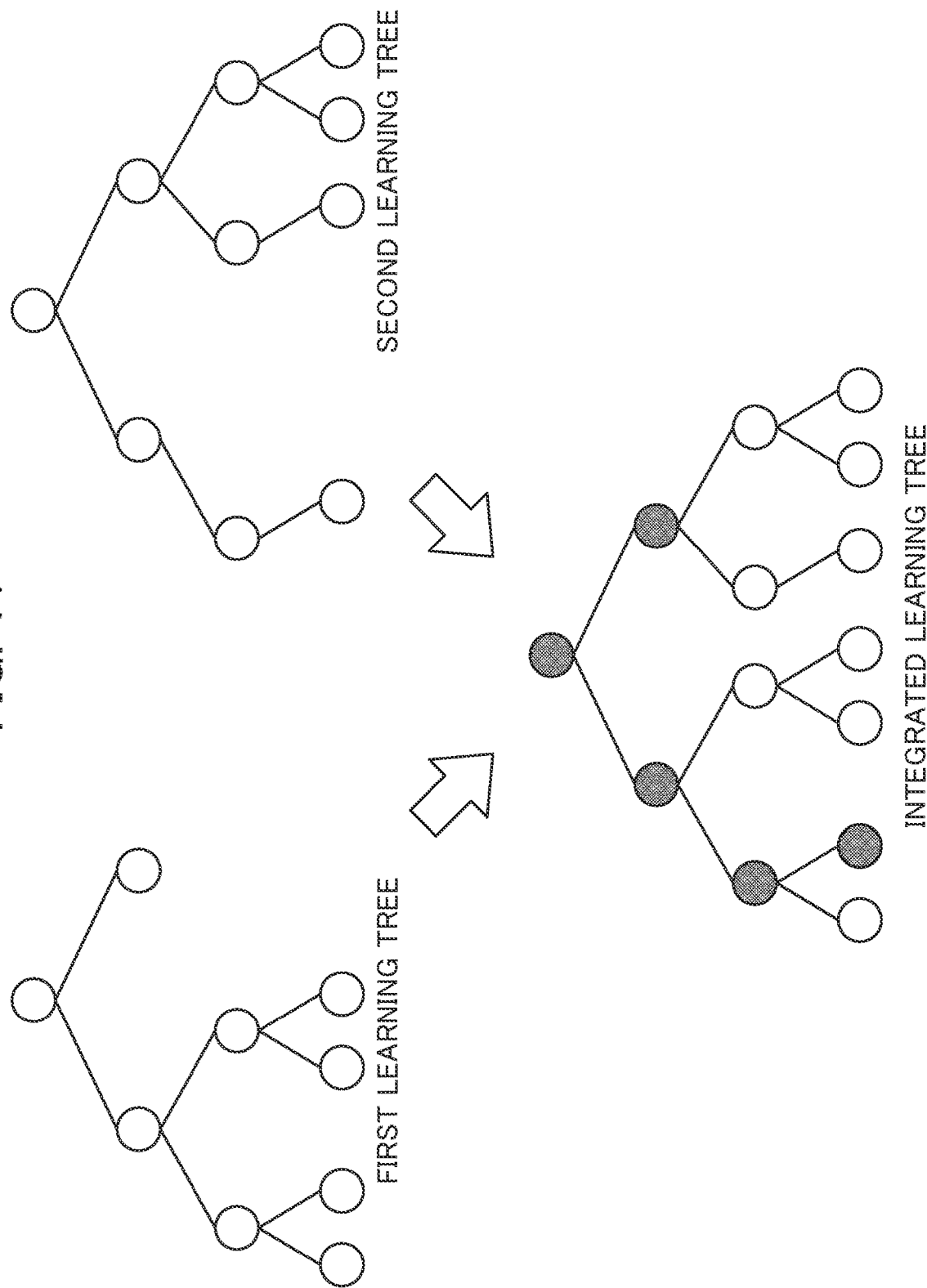
FIG. 11 is a conceptual diagram (part 1) related to the integration process.

FIG. 11 is a conceptual diagram related to integration of learning trees. As is clear from the drawing, when the first learning tree at the upper left of the drawing and the second learning tree at the upper right of the drawing are integrated, as shown in the bottom row of the drawing, an integration process is performed at the black nodes, whereas the nodes of the first learning tree or the second learning tree are duplicated at the white nodes.

With such a configuration, learning models based on a tree structure are integrated, so that it is possible to perform an integration process easier than a neural network or the like.

Further, with such a configuration, the individual learned models from multiple operating devices 3 that have performed additional learning can be aggregated and integrated into the integration processing server 2, so that learned models that can be used for general purposes in such operating devices can be generated.

<1.2.5 Download Step>

Returning to FIG. 4, when the process of integrating learned models in the integration processing server 2 (S50) ends, the integrated model (universal learned model) is downloaded from the integration processing server 2 to each operating device 3 via the network (S60). To be specific, after the lapse of a predetermined period of time, the owner of the operating device 3, for example, downloads the integrated model to an information processing device such as a personal computer (not shown in the drawing), and transfers the integrated model from the information processing device to each operating device 3 via the I/O unit 45 and then stored in each storage unit 42 of the operating device 3. The process then ends.

With such a configuration, it is possible to more accurately control the operating device 3 using the integrated model in which various characteristics of the operating device 3 are learned. In addition, the owner of the operating device 3 can select whether to use the already-installed learned model or to use the integrated model.

In this embodiment, the configuration is such that the owner of the operating device 3 or the like temporarily downloads the integrated model to an information processing device such as a personal computer (not shown in the drawing); however, the present disclosure is not limited to such a configuration. Therefore, for example, the configuration may be such that the owner of the operating device 3, for example, commands the operating device 3 to download, whereby the operating device 3 downloads the latest integrated model via the communication unit 43.

2. Second Embodiment

The second embodiment of the present invention will now be described with reference to FIGS. 13 to 16. In this embodiment, various accompanying information is used for the process for integration of the learned models.

Figure 13:
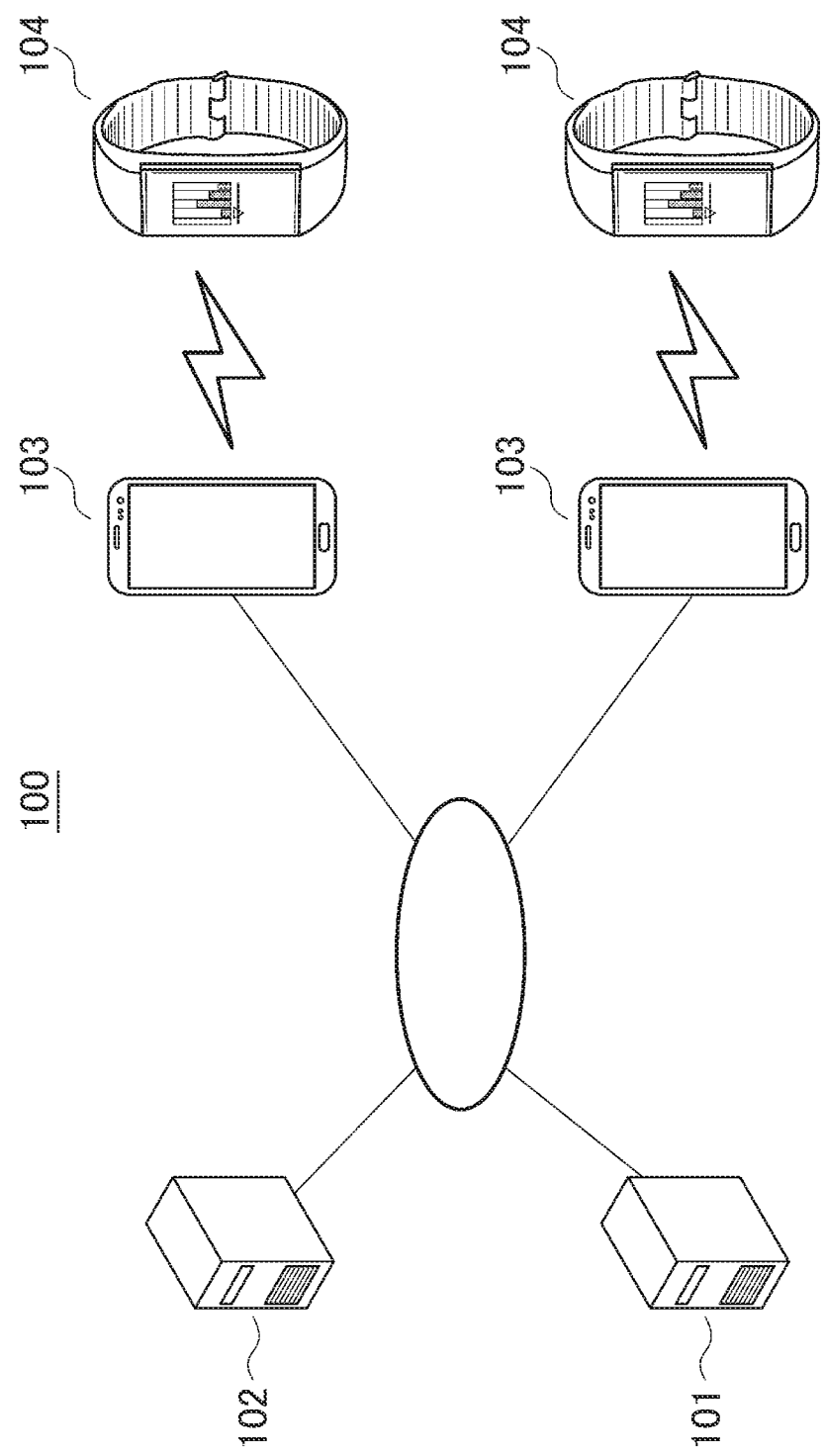
FIG. 13 is an overall configuration diagram of a system (second embodiment).

FIG. 13 is an overall configuration diagram of the universal learned model generating system 100 according to this embodiment. As is clear from the drawing, the universal learned model generating system 100 consists of a first information processing device 101, a second information processing device 102, and an information processing terminal 103 connected to each other via a network such as the Internet. The devices exchange information through communication.

As described later, the first information processing device 101 is mainly in charge of a learning process, and performs initial learning and a process for integrating learned models, for example. The second information processing device 102 functions as an application server, and performs, for example, a process for providing a predetermined application program to the information processing terminal 103, a process for a predetermined server, and the like and establishes information communication between the first information processing device 101 and the information processing terminal 3. The information processing terminal 103 is an information processing device such as a smartphone or a tablet computer, and can download a predetermined application program from the second information processing terminal 102. The information processing terminal 103 provides a predetermined application to the user in cooperation with the second information processing device 102. The information processing terminal 103 is connected to a wearable terminal 104 that can be paired according to a standard such as Bluetooth (registered trademark). The wearable terminal 104 includes various sensors for sensing blood pressure, heart rate, body temperature, the number of steps, and the like. The acquired sensor information is transmitted to the information processing terminal 3. Note that the device configuration of each device is substantially the same as the configuration shown in FIG. 2.

Here, although various examples can be considered as the contents of the application program, in this embodiment, the application program predicts the risk of a predetermined disease of the user of the wearable terminal 104, for example, using various sensor information as an input acquired from the wearable terminal 104. The information acquired from the sensor includes vital sign information such as blood pressure, heart rate, and body temperature, and activity amount information such as the number of steps.

Figure 14:
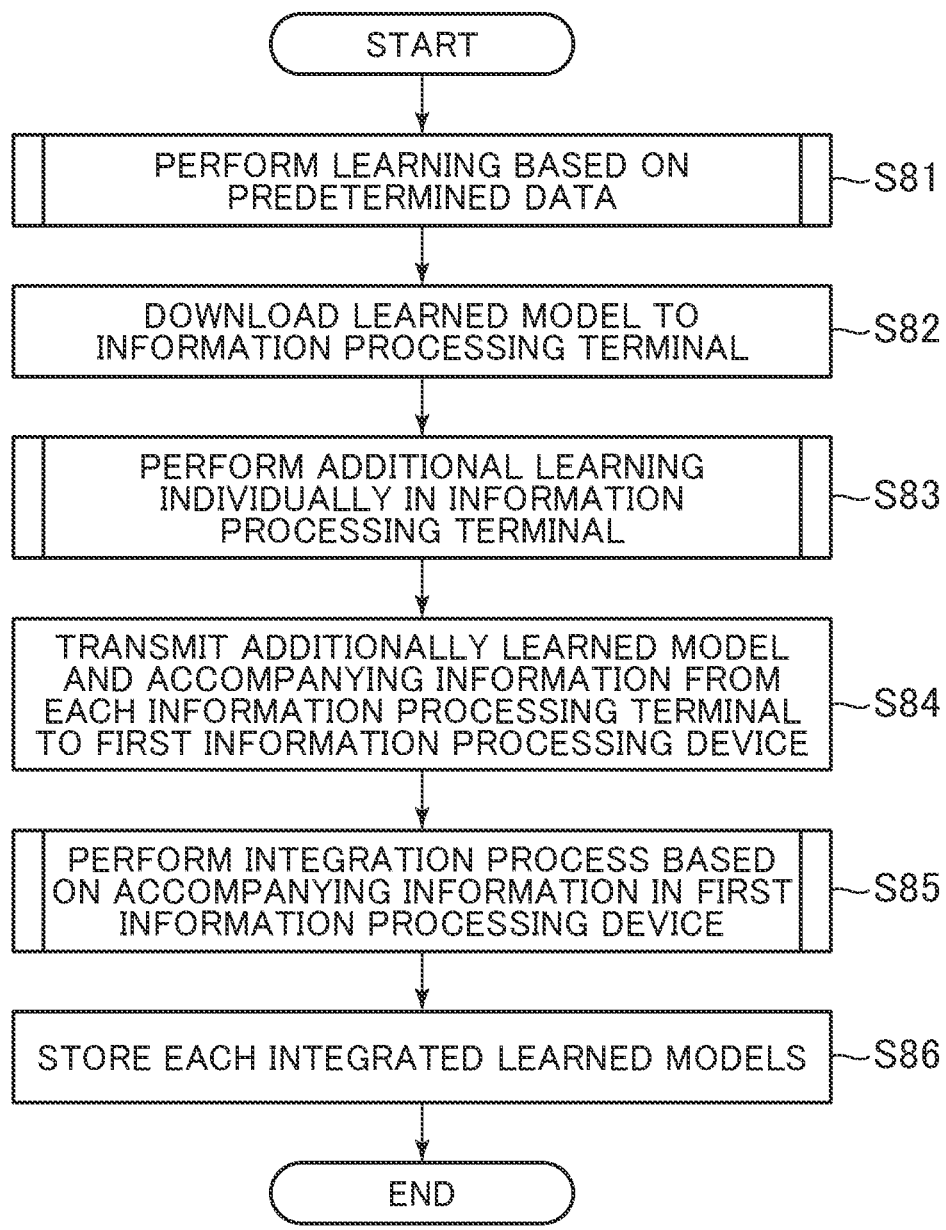
FIG. 14 is a general flowchart related to generation of a universal learned model (second embodiment).

FIG. 14 is a general flowchart related to generation of a universal learned model, according to this embodiment.

When the process starts, initial learning using a learning model having a tree structure similar to that of the first embodiment (S81) is performed in the first information processing device 101. The details of the learning process are substantially the same as those in FIGS. 5 and 6, and its detailed description will therefore be omitted.

However, the learning process according to this embodiment is performed by supervised learning that uses vital information such as blood pressure, heart rate, and body temperature and activity amount information such as the number of steps as inputs, and target data which is disease information (various numerical values, diagnosis results, and evaluations related to health conditions) on various actual users. In other words, the learning process yields a learned model that outputs disease information such as a disease risk predicted for a user based on vital information and activity amount information.

The learned model generated in the first information processing device 101 is downloaded to each information processing terminal 103 via application software executed on the information processing terminal 103 (S82). Note that it may be downloaded to each information processing terminal 103 in response to a command from the information processing terminal 102 functioning as an application server.

At this time, the information processing terminal 103 receives input of accompanying information on the user through the application program, and stores it in the internal storage unit. The accompanying information is, for example, information on the age, gender, or area where the user lives.

After that, the information processing terminals 103 separately perform additional learning (S83). The details of the additional learning process are substantially the same as those shown in FIGS. 7 and 8, and its detailed description will therefore be omitted. However, in the additional learning process in this embodiment, actual disease information on each user input via application software is used as actual operation data. The end of the operation (S303) is determined, for example, depending on the elapse of a predetermined period of time.

After the lapse of the predetermined period of time, the additionally-learned learned model and the accompanying information on the user to which the learned model is to be transmitted are transmitted to the first information processing device 101 (S84).

Upon reception of the additionally-learned learned model and the accompanying information, the first information processing device 101 performs a process for integrating the learned models based on the accompanying information (S85).

The details of the integration process are substantially the same as those shown in FIGS. 9 to 12, and its detailed description will therefore be omitted. However, in the integration process according to this embodiment, a process for selecting a learned model to be integrated is performed before the integration process shown in FIG. 9.

Figure 15:
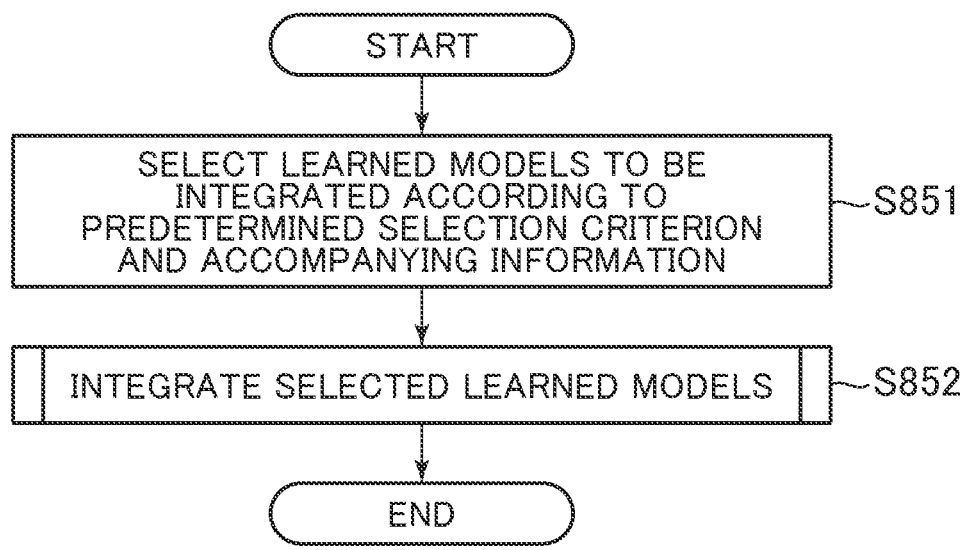
FIG. 15 is a flowchart related to a process for selecting a learned model to be integrated.

FIG. 15 is a flowchart related to a process for selecting a learned model to be integrated. As is clear from the drawing, when the process starts, the first information processing device 101 selects a learned model to be integrated, according to a predetermined selection criterion and the received accompanying information (S851). Here, the predetermined selection criterion is a selection criterion stored in advance in the first information processing device 101 or set by another device or terminal, and its contents may include information on the area where the user lives. In other words, the first information processing device 101 performs, for example, a process for selecting only a learned model related to a user who lives in the same area.

After that, a process for appropriately integrating the selected learned models is performed to obtain a plurality of universal learned models (S852). In other words, each universal learned model is obtained by integrating learned models related to users who live in the same area. Note that the integration process is substantially the same as that shown in FIG. 9 and its description will therefore be omitted.

Figure 16:
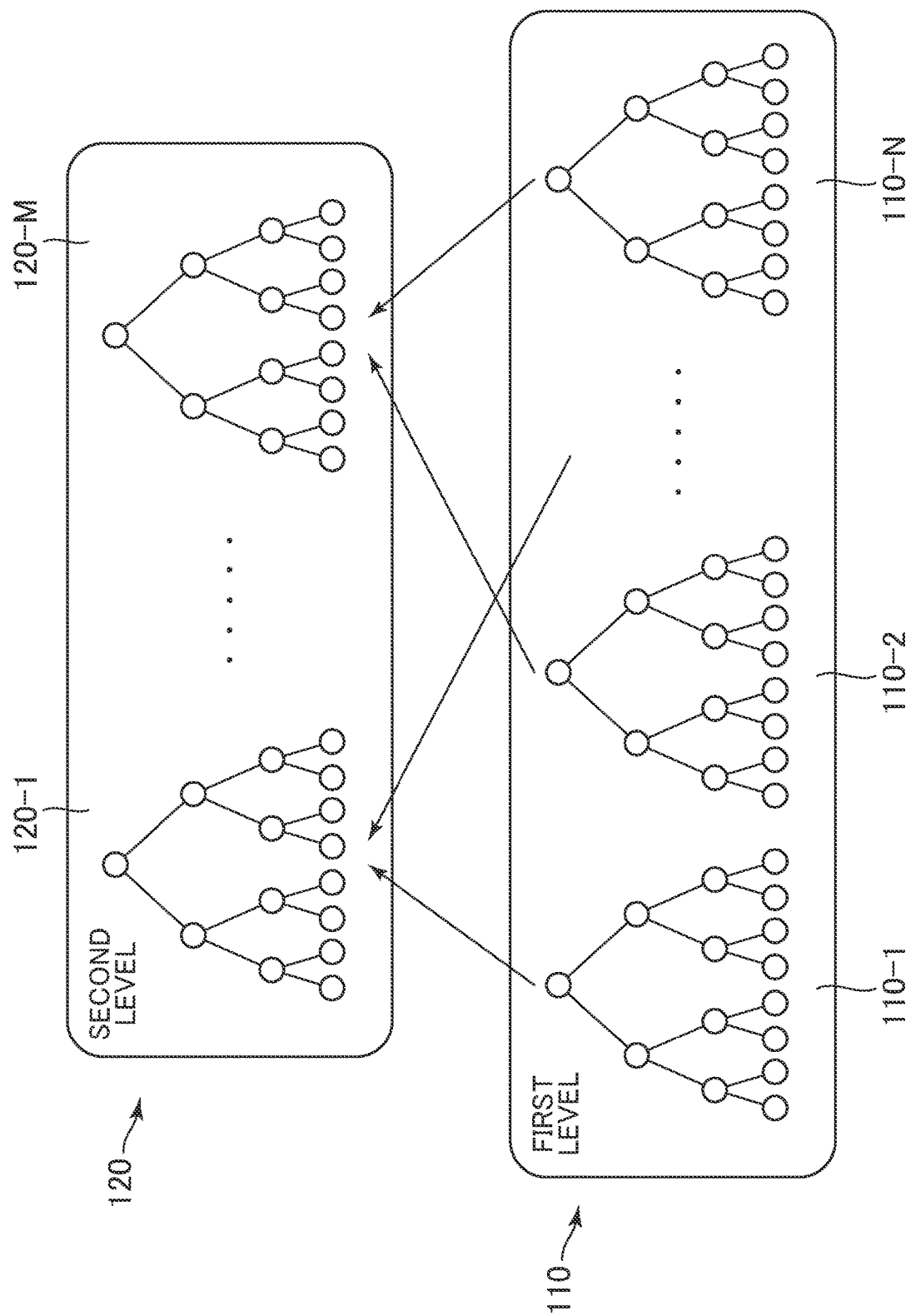
FIG. 16 is a conceptual diagram of an integration process based on accompanying information.

FIG. 16 is a conceptual diagram of the integration process (S85) based on the accompanying information. In the drawing, a plurality of learned models having a tree structure are arranged in two upper and lower stages. The lower stage (first level) consists of a plurality of learned models 110-1 to 110-N (N is a natural number of 2 or more) on which additional learning has been individually performed in each information processing terminal 103. The upper stage (second level) consists of a plurality of learned models 120-1 to 120-M (M is a natural number of two or more) having a tree structure generated by integrating the lower learned models 110-1 to 110-N. As is clear from the drawing, for example, in the case where the predetermined selection criterion is the area where the user lives, a plurality of learned models are integrated based on a plurality of learned models in the lower level obtained from users living in the same region, thereby generating a plurality of learned models having the tree structure shown in the upper stage (second level).

Returning to FIG. 14, when the integration process (S85) ends, a process for storing the integrated learned models is performed, and the process ends (S86). Note that the stored learned models may be configured to be downloadable to the respective information processing terminals 103 thereafter. Each stored learned model may be transmitted to the second information processing device. At this time, the corresponding learned model can be downloaded according to the accompanying information. For example, a predicted model (learned model) suitable for one who lives in the same area as the user may be downloaded.

With such a configuration, the additional learned models are integrated based on the predetermined selection criterion and the accompanying information, so that a universal learned model in which the learned models having the common accompanying information are integrated can be generated. As a result, a learned model suitable for a specific application or user can be generated.

3. Variation

Although the operating device 3 transmits the learned model obtained by additional learning in the first embodiment, the present disclosure is not limited to such a configuration. Accordingly, for example, the integration may be accomplished by transmitting operation data from the operating device 3 to the integration processing server 2 and learning the operation data in the integration processing server 2.

The timing of when the learned model obtained by additional learning is transmitted is not particularly limited in the aforementioned embodiment, but the transmission may be performed after a certain progress in additional learning, or may be performed each time.

Information is collected to the integration processing server 2 on the network in the above-described embodiment, but may be collected to, for example, a programmable logic controller (PLC) connected to the network.

A robot arm is illustrated as the operating device 3 in the first embodiment, but is not limited to such an operating device. It is therefore applicable to various operating devices such as sensor devices, mobile phones, automobiles, drones, AI speakers, ships, marine floats, tunnel excavation shields, heavy construction equipment, railways, EVs, air conditioning, compressors, factory machines, home robots, fusion control, PLC, communication gateways, smart houses, wearable terminals, home appliances, various meters (for example, electric, water, and gas meters), and game machines. Note that operation according to the present disclosure is not limited to only mechanical operation of devices, but also includes, for example, electrical or electromagnetic operation of devices.

Learned models, which have been learned in advance, are mounted on the integrated circuits 4, and the integrated circuits 4 are incorporated into the operating devices 3 and then separately subjected to additional learning in the first embodiment, but the present disclosure is not limited to such a configuration. Accordingly, for example, after pre-learning is performed in the information processing device 1 to generate a learned model, the learned model is directly or indirectly downloaded to each operating device 3, and additional learning may be performed in each operating device 3 based on the downloaded learned model.

The information processing device 1 and the integration processing server 2 are shown as separate components in the first embodiment, but may be integrated. In addition, some functions may be independent or distributed processes.

Each integrated circuit 4 in the first embodiment may be a field-programmable gate array (FPGA) or the like.

In the second embodiment, the integration process based on the accompanying information is performed in two stages as shown in FIG. 16. However, the present invention is not limited to such a configuration. For this reason, for example, a configuration may be adopted in which integration is performed in multiple stages and each result is stored, and an appropriate integrated learned model is provided in response to a request from the information processing terminal 103 or the like.

Figure 17:
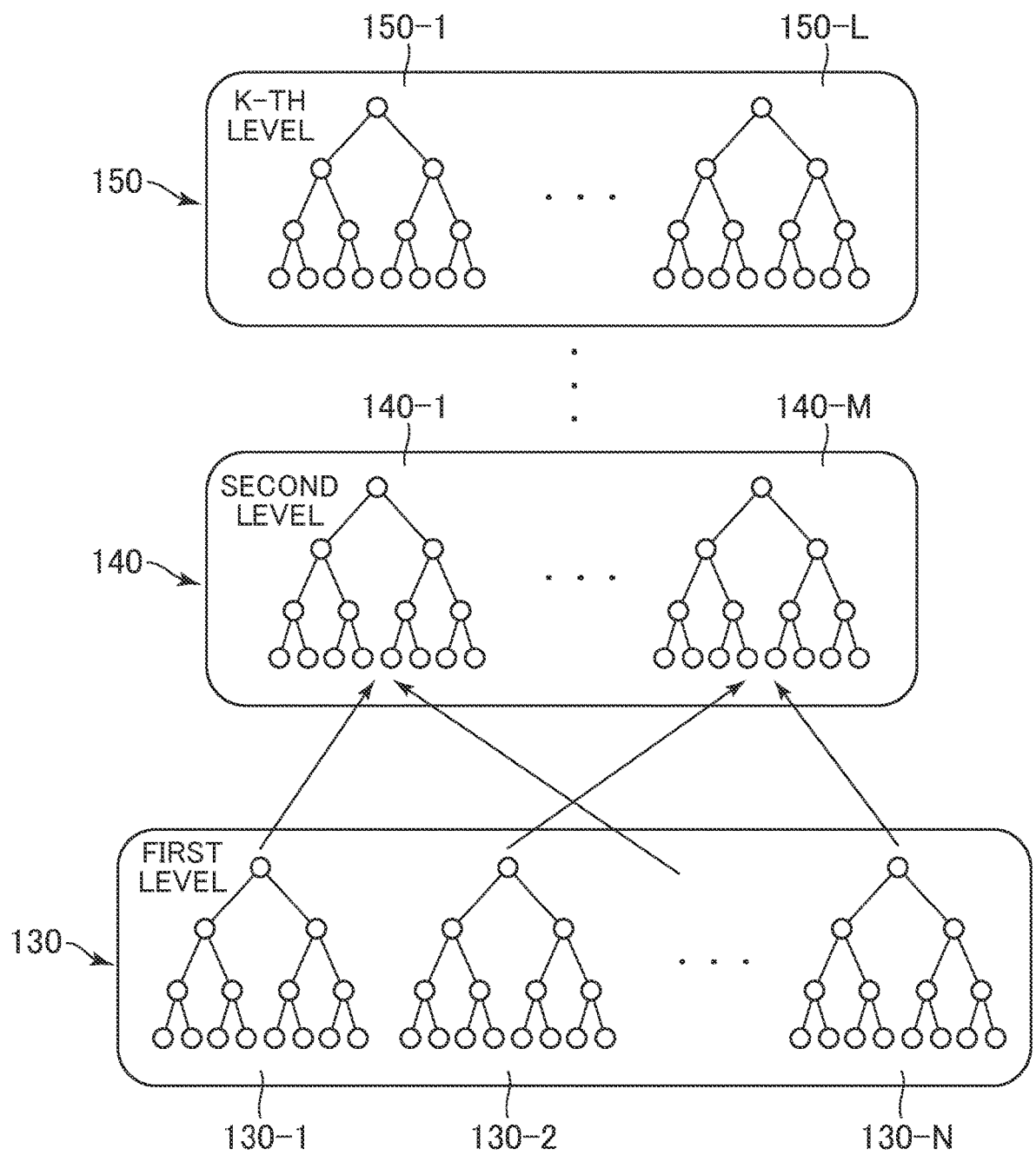
FIG. 17 is a conceptual diagram of a multi-stage integration process performed using accompanying information.
Figure 18:
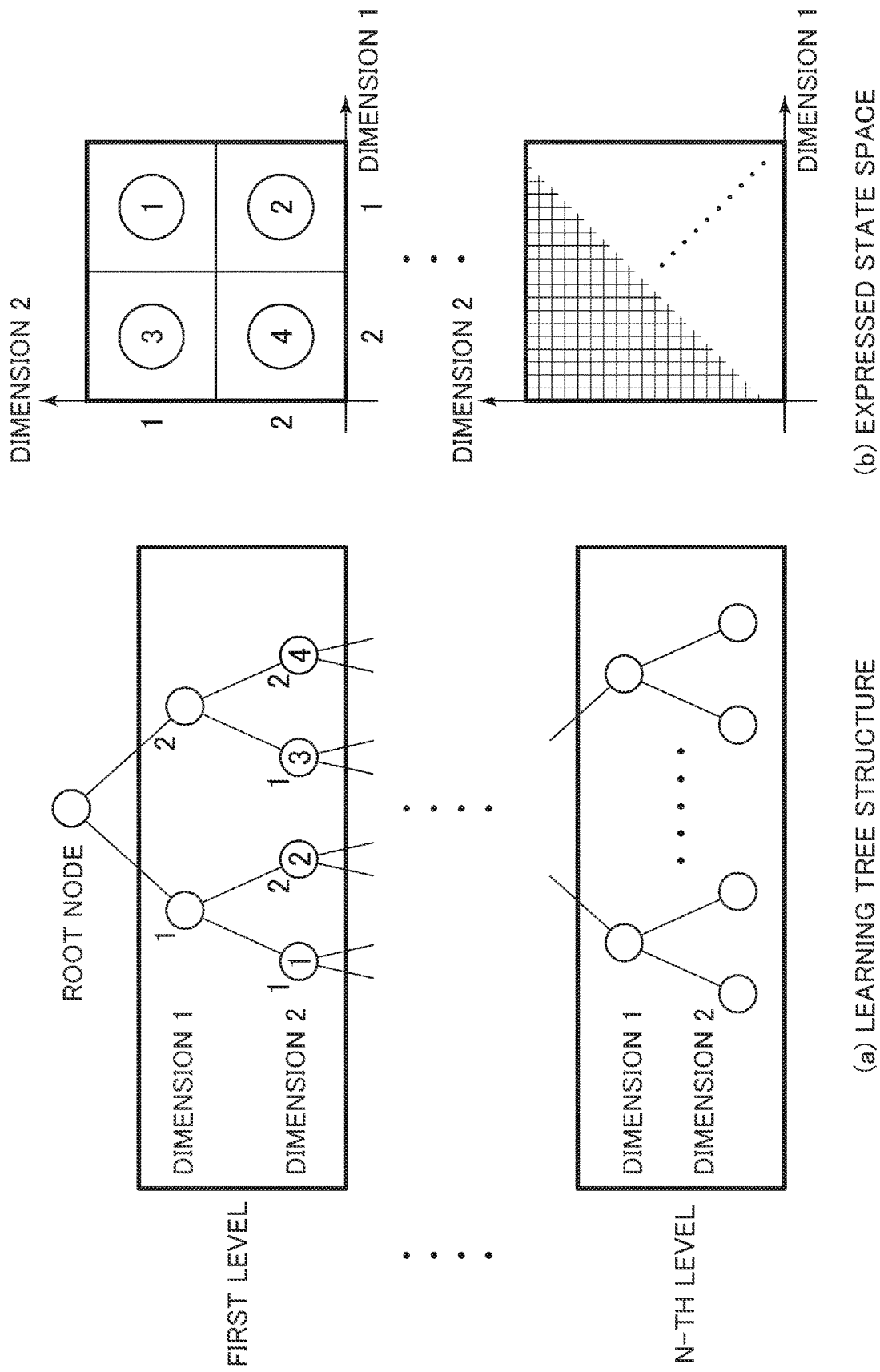
FIG. 18 is an explanatory diagram related to the basic configuration of a learning tree.

FIG. 17 is a conceptual diagram of a multi-stage integration process performed using accompanying information. The bottom row shows a first level 130 consisting of the learned models 130-1 to 130-N obtained by performing additional learning in the individual information processing terminals 103. The middle row shows a second level 140 consisting of learned models 140-1 to 140-M obtained by integrating the learned models in the immediately lower level. The top row shows the K-th level 150 consisting of the learned models 150-1 to 150-L obtained by integrating the learned models in the immediately lower level. As shown in the drawing, a multi-stage integration process may be performed based on the accompanying information. For example, in the second level, the learned models of the first level may be integrated based on the area information or the like, and in the third level, the integration process may be performed based on the area information from a broader viewpoint. In the other levels, the integration process may be performed in stages based on gender, age information, and the like.

Such a configuration provides an appropriate integrated learned model to the information processing terminal 103 and the second information processing device 102 as necessary.

A learning model using a tree structure is adopted as the learning model in the aforementioned embodiment, but this method is not the only way. Thus, another integrable learning model can be adopted.

INDUSTRIAL APPLICABILITY

The present invention is applicable in industries that produce universal learned model generating systems.

REFERENCE SIGNS LIST

1 Information processing device
2 Integration processing server
3 Operating device
4 Integrated circuit
5 Universal learned model generating system
100 Universal learned model generating system
101 First information processing device
102 Second information processing device
103 Information processing terminal
104 Wearable terminal

The invention claimed is:

1. A method for generating a universal learned model, comprising:
    subjecting a predetermined machine learning model to learning based on predetermined initial data to generate a first initial learned model;
    incorporating the generated first initial learned model into a plurality of operating devices;
    operating each of the operating devices according to the respectively incorporated first initial learned model;
    performing, by each of the operating devices, additional learning based on respective operation data obtained by the operation of the respective operating devices according to the first initial learned model to respectively generate a plurality of individual learned models; and
    integrating the plurality of individual learned models to generate a universal learned model for respectively operating the operating devices.

2. The method for generating a universal learned model, according to claim 1,
    wherein the first initial learned model is generated in a predetermined initial learning server connected to a network, and
    wherein the first initial learned model is incorporated into the operating devices by downloading the first initial learned model from the initial learning server to each operating device via the network.

3. The method for generating a universal learned model, according to claim 1,
    wherein the first initial learned model is incorporated into the operating devices by mounting the initial learned model on an integrated circuit and incorporating the integrated circuit having the first initial learned model mounted thereon into each operating device.

4. The method for generating a universal learned model, according to claim 1, further comprising:
    incorporating the universal learned model into each operating device.

5. The method for generating a universal learned model, according to claim 1,
    wherein the machine learning model is a learning model having a tree structure in which a plurality of nodes associated with respective hierarchically divided state spaces are hierarchically arranged.

6. The method for generating a universal learned model, according to claim 1,
    wherein the integrated circuit includes a communication unit that communicates with a predetermined integration processing server,
    wherein the individual learned models are transmitted from the respective operating devices to the integration processing server via the respective communication units, and
    wherein integrating the plurality of individual learned models is executed in the integration processing server.

7. The method for generating a universal learned model, according to claim 1,
    wherein the initial data is data generated based on a test or a simulation of an operating device.

8. The method for generating a universal learned model, according to claim 1, wherein integrating the plurality of individual learned models comprises:
selectively integrating the individual learned models according to accompanying information for the respective individual learned models.

9. A method for generating a universal learned model, comprising:
subjecting a predetermined machine learning model to learning based on predetermined initial data to generate a first initial learned model;
incorporating the generated first initial learned model into a plurality of operating devices;
operating each of the operating devices according to the respectively incorporated first initial learned model;
performing, by each of the operating devices, additional learning based on respective operation data obtained by the operation of the respective operating devices according to the first initial learned model to respectively generate a plurality of individual learned models;
integrating the individual learned models to generate a universal learned model for respectively operating the operating devices; and
incorporating the universal learned model into the respective operating devices.

10. A universal learned model generating system, comprising:
a first processor coupled to a network and coupled to a first memory;
a second processor coupled to a network and coupled to a second memory; and
a plurality of operating devices coupled to the network,
wherein the first process is configured to subject a predetermined machine learning model to learning based on predetermined initial data to generate a first initial learned model,
wherein each of the plurality of operating devices is configured to:
operate according to the first initial learned model which is respectively incorporated thereon, and
perform additional learning based on respective operation data obtained by the operation of the respective operating devices according to the first initial learned model to respectively generate a plurality of individual learned models, and
wherein the second processor is configured to:
integrate the plurality of individual learned models to generate a universal learned model for respectively operating the operating devices.

11. The method for generating a universal learned model, according to claim 1,
wherein each operating device is a factory machine.

12. The method for generating a universal learned model, according to claim 9,
wherein each operating device is a factory machine.

13. The universal learned model generating system, according to claim 10,
wherein each operating device is a factory machine.

* * * * *